United States Patent
Cooke

(10) Patent No.: US 6,215,220 B1
(45) Date of Patent: Apr. 10, 2001

(54) DIRECT-DRIVE MODEL RAILROAD MOTOR

(75) Inventor: Warren P. Cooke, Elkton, MD (US)

(73) Assignee: Robert S. Bean, Elkton, MD (US)

( * ) Notice: Subject to any disclaimer, the term of this patent is extended or adjusted under 35 U.S.C. 154(b) by 0 days.

(21) Appl. No.: 09/477,583

(22) Filed: Jan. 4, 2000

Related U.S. Application Data

(60) Provisional application No. 60/115,337, filed on Jan. 11, 1999.

(51) Int. Cl.$^7$ .............................. H02K 5/04; H02K 3/46; B61C 3/00; B60L 9/04
(52) U.S. Cl. .......................... 310/136; 310/154; 104/288; 105/54
(58) Field of Search .................................... 310/136, 140, 310/141, 142, 152, 154; 105/54; 104/288

(56) References Cited

U.S. PATENT DOCUMENTS

| | | | |
|---|---|---|---|
| 500,851 | 7/1893 | Case .................................... | 105/57 |
| 1,055,598 | 3/1913 | Balachowsky et al. ............... | 105/57 |
| 1,862,248 | 6/1932 | Wesnigk ............................... | 105/54 |
| 2,536,344 | 1/1951 | Bean ..................................... | 105/54 |
| 3,072,812 | 1/1963 | Gaddes ................................. | 310/154 |
| 3,616,761 | 11/1971 | Valls ..................................... | 104/148 |
| 3,646,892 | 3/1972 | Halmai et al. ........................ | 104/148 |
| 3,983,430 | 9/1976 | Howard ................................ | 310/155 |

*Primary Examiner*—Nestor Ramirez
*Assistant Examiner*—Judson H. Jones
(74) *Attorney, Agent, or Firm*—Ratner & Prestia

(57) ABSTRACT

A motor comprising an axle adapted to rotate about an axis; a wound armature fixed to and concentric with the axis; two segmented wheel commutators adapted to conduct electricity across a set of tracks and fixed on opposite ends of the axle concentric with the axis, a motor casing surrounding and enclosing the armature; and a pair of permanent magnets attached opposite one another on the sides of the casing. A pair of bearings with a plurality of wire channels may be fixed to the axle and adapted to rotate with the axle in each casing end cap, each wire channel adapted to pass a wire electrically connected to a segment in one wheel commutator, running across the armature, and connected to a segment of the opposite wheel commutator. Each wheel may consist essentially of conductive segments separated by nonconductive epoxy, with a non-conductive bushing centered therein to receive the axle.

4 Claims, 3 Drawing Sheets

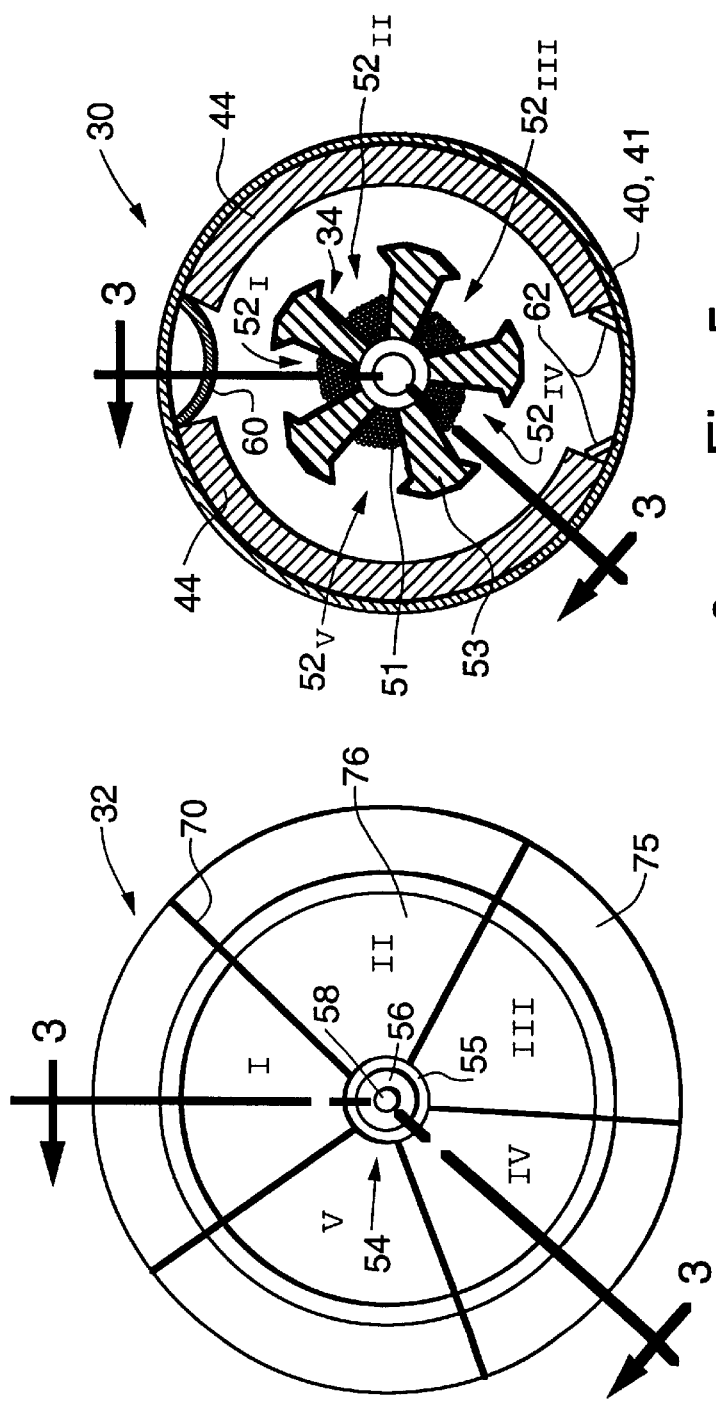

DIRECT-DRIVE MODEL RAILROAD MOTOR

CLAIM OF PRIORITY

This application claims priority based upon U.S. Provisional Patent Application Ser. No. 60/115,337, filed on Jan. 11, 1999.

FIELD OF THE INVENTION

This invention relates to motors for electric railways, and more particularly, to motors for model electric railways.

BACKGROUND OF THE INVENTION

Model railroad motors are powered by drawing direct current (D.C.) electricity through the rails on which the train runs, the power being conducted through the metal wheels of the model train, onto contacts that touch the metal wheels, and through wires to a small D.C. motor known in the art. The D.C. motor then converts the electric power to rotational energy, which is then transferred by a worm gear or other type of gearing to the wheels of the train motor. The use of a set of gears for transmission of power from the motor to the wheels results in a certain loss in efficiency, ultimately limiting the speed of the train. The use of a worm gear transmission also results in model train engines that characteristically stop abruptly when the power is shut off, rather than coasting to a stop gradually to simulate the action of actual railroad engines braking against substantial momentum.

It is known in the art, as an alternative to model railroad engines with gear transmissions, to provide a direct-drive model railroad engine that uses segmented wheels on the train as "rolling commutators" connected to an armature in between, as is described in U.S. Pat. No. 2,536,344 ('344 patent) to Herbert S. Bean. As shown in FIG. 1 of the '344 patent, essentially reproduced and renumbered herein as FIG. 1, such a motor comprises a permanent magnet 10, a rotatable armature 12 between the poles thereof, and two separate commutators (wheels) 14 and 16 mounted at opposite ends of the armature and adapted to ride upon a pair of rails 17. Wheels 14 and 16 are divided into a plurality of conductive segments 18, each segment being insulated from the others, and each electrically connected to a coil of the armature. Segments 18 are rigidly held between two insulating discs 20 and 22 that form part of each wheel 14 and 16, as shown in FIG. 2.

Other details of the motor are described in the '344 patent, which is incorporated herein by reference. As is apparent from FIG. 1, however, permanent magnet 10 as shown and described in the '344 patent is a standard horseshoe magnet that hangs from a bridge 24 above the motor. This placement of the magnet above the motor makes the assembled train top-heavy, and likely to tip over or derail when negotiating turns quickly. Thus, there is a need in the art for an electric model railway motor that provides the advantages of direct-drive without the top-heaviness inherent in the use of an overhead horseshoe magnet.

SUMMARY OF THE INVENTION

In accordance with the present invention there is provided a motor comprising an axle adapted to rotate about an axis; a wound armature fixed to and concentric with the axis; two segmented wheel commutators fixed on opposite ends of the axle concentric with the axis, a motor casing surrounding and enclosing the armature; and a pair of permanent magnets attached opposite one another on the sides of the casing. Each commutator comprises a plurality of segments insulated from one another. The commutators are adapted to conduct electricity across a set of tracks. The casing further comprises opposite end caps and a cylindrical body concentric with the axis.

The motor may further comprise a bearing aperture in each casing end cap and a first and second bearing, each bearing fixed to and adapted to rotate with the axle concentric with the axis. Each bearing is mounted in a bearing aperture in the casing end cap and has a plurality of wire channels therethrough. Such motor also comprises a plurality of wires, each wire electrically connected between one segment of one wheel commutator and an opposite segment of the opposite wheel commutator. Between said commutators, each wire is disposed through one of said bearing wire channels in said first bearing, across said armature, and through one of said bearing wire channels in said second bearing.

Each wheel may consist essentially of conductive segments separated by nonconductive epoxy, and a nonconductive bushing centered therein and adapted to receive the axle.

BRIEF DESCRIPTION OF THE DRAWINGS

The invention will be described with reference to the following figures:

FIG. 4 is an outside end view schematic illustration of an exemplary segmented wheel commutator of FIG. 3.

FIG. 5 is a cross-sectional schematic illustration of the exemplary motor of FIG. 3.

FIG. 6 is an inside end view schematic illustration of an exemplary bearing of FIG. 3.

DETAILED DESCRIPTION

Figure 1:
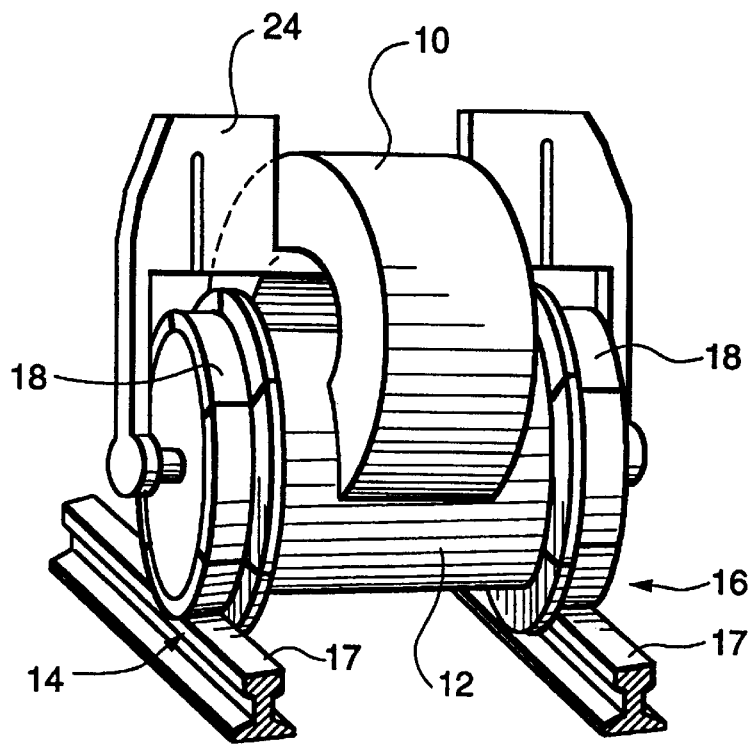
FIG. 1 is a perspective drawing of a motor according to U.S. Pat. No. 2,536,344.

The invention will next be illustrated with reference to the figures wherein similar numbers indicate the same elements in all figures. Such figures are intended to be illustrative rather than limiting and are included to facilitate the explanation of the apparatus of the present invention. Referring now to FIGS. 3–6 there are shown a longitudinal-section illustration of an exemplary motor 30 of the present invention, an end-view illustration of an exemplary segmented wheel 32, a cross-section illustration of motor 30, and an inside end-view of bearing 36, respectively.

Motor 30 comprises an axle 38 having an axis "A" therethrough. A wound armature 34, comprising windings 51 and poles 53 as are well known in the art, is concentrically fixed on axle 38, and two segmented wheel commutators 32 and 33 concentrically fixed on opposite ends of the axle. Motor casing 40 surrounds and encloses armature 34 without touching it. Motor casing 40 further comprises a cylindrical body 41 and opposite end caps 42 and 43. A pair of permanent magnets 44 attach to opposite sides of casing body 40. In each end cap 42 and 43 is mounted a bearing 36 or 36' respectively. Bearing 36 and 36' each have a plurality of wire channels $46_I$–$46_V$ therethrough, as well as a hole 48 for receiving axle 41.

Figure 3:
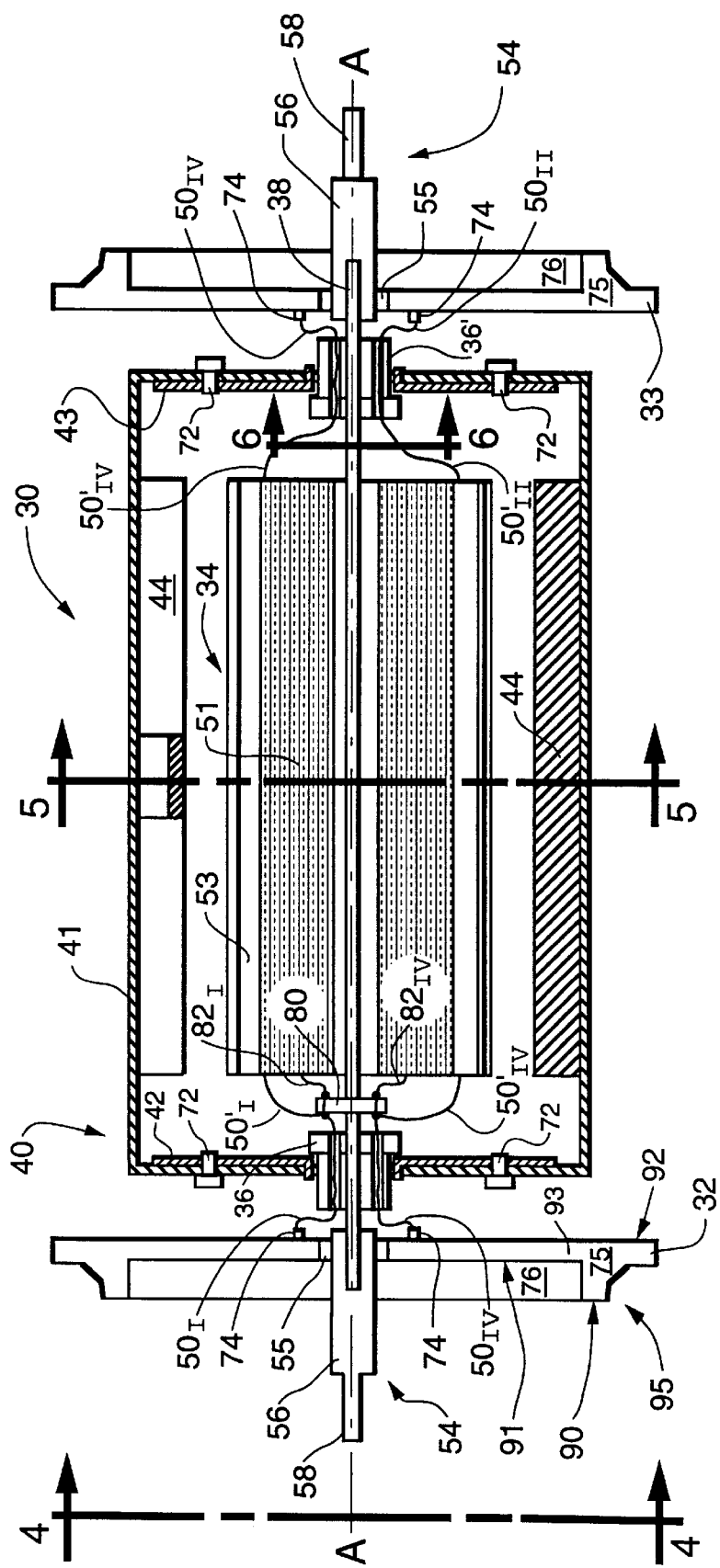
FIG. 3 is a longitudinal-sectional schematic illustration of an exemplary motor according the present invention.

Each wheel comprises a number of conductive pie-shaped segments, as shown in FIG. 4, where exemplary wheel 32 is shown having segments numbered I through V. Each segment has a wire stub 74 protruding therefrom. Wires 50$_I$–50$_V$ are attached to each segment I–V respectively at wire stub 74, pass through the similarly subscripted wire channel 46$_I$–46$_V$, and connect to junction disk 80. Junction disk 80, which may be a standard segmented motor commutator machined down so that it has only enough diameter left to receive wires, provides a location where winding terminations 82$_I$–82$_V$ from each armature coil sector 52$_I$–52$_V$ can be attached to wires 50$_I$–50$_V$ that attach to the commutators. Another set of wires 50'$_{I-V}$, each electrically connected to respective wires 50$_{I-V}$ and 82$_{I-V}$ at junction disk 80, run across the armature coil, through wire channels 46$_{I-V}$ in bearing 36' and connect to opposite wheel 33. Each wire 50'$_{I-V}$ passes through the wire channel 46$_{I-V}$ in bearing 36' and connects to the sector I–V in wheel 33 that is 144° opposite the sector of wheel 32 from which the wire originated. To make the transition from one side to another smoothly, the armature coil sector 52$_I$–52$_V$ through which wire 50'$_{I-V}$ passes may typically be the sector having the subscript sequentially between the subscripts of the wheel sectors it connects. For instance, as shown in FIG. 3, wire 50$_{IV}$ connected to wire stub 74 in sector IV of wheel 32 passes through wire channel 46$_{IV}$ of bearing 36, connects to winding 82$_{IV}$ and wire 50'$_{IV}$ at junction disk 80. Wire 50'$_{IV}$ runs across armature 34 in coil sector 52$_V$, passes through wire channel 46$_I$ of bearing 36', and connects to segment I of wheel 33. In similar fashion, wire 50'$_I$ connects segment I of wheel 32 to segment III of wheel 33, segment II is connected to IV, III to V, and V to II. Alternately, segment I could be connected to segment IV, II to V, and so on.

Axle 38, armature 34, bearings 36, and wheels 32 and 33 are fixed as a single body that rotates about axis "A" within casing 40. The casing is fixed to the train body (not shown) so that it does not rotate. By providing casing 40 into which magnets 44 mount, motor 30 has a lower center of gravity than a motor of the '344 patent as shown in FIG. 1 having externally mounted horseshoe magnet 16. Thus, a train engine in which a motor of the present invention, such as motor 30, is mounted, has a lower center of gravity, enabling greater stability without risk of tipping over while negotiating turns in the track. Because casing 40 encloses armature 34, motor 30 is weatherproof, making it ideal for outdoor garden model railroad trains. Enclosing armature 34 and magnets 44 within casing 40 introduces the problem, however, of needing to pass wires 50$_{I-V}$ through casing 40 without damaging them during rotation of axis 38. Novel bearing 36 of this invention solves that problem.

Wheels 32 and 33 may be constructed from a standard conductive wheel known in the art that is cut into a desired number of segments. Although five segments I through IV are shown in FIG. 4, any number of segments may be chosen. The segments are then reassembled with a nonconductive material, such as an epoxy (for example, Marinetex, manufactured by Travico Labs, a division of ITW-Philadelphia Resins or Montgomeryville, Pa.) in slots 70 between adjacent segments. In particular, the wheels may be constructed by an exemplary process having the following steps, referring to completed wheel 32 in FIGS. 3 and 4:

1. A standard metal railroad wheel 32 is hollowed out on the outer side 90, providing a dished region 91. The hollowing step may leave a strip 93 between dished region 91 and wheel inner side 92 having a thickness of only several mils. Although a thicker strip 93 may remain, the benefit of a thinner strip is that there is less metal to act as a heat sink during subsequent soldering steps.

2. Wire stubs 74 are soldered to the inner side 92 of wheel 32.

3. Epoxy is poured into dished region 91 and extended outward therefrom, creating a cylindrical epoxy section 76 having a cylinder height extending outward from the wheel (not shown) to serve as an in-process epoxy handle for the wheel. For convenience, fabricating the epoxy handle may comprise fitting the end of a cylindrical tube (not shown) over the track-riding portion 95 of wheel 32, so that when the epoxy is poured into the tube it fills dished region 91 as well as the tube. When the epoxy is dry, the wheel may then be put in a lathe to reduce the diameter of the epoxy handle back down to the diameter of dished region 91.

4. The metal portion 75 of the wheel is cut into the desired number of segments (I–V as shown in FIG. 4), leaving the epoxy handle uncut, so that the handle holds the wheel together. This cutting step may be performed on a model-maker's lathe using a divider head.

5. Each cut slot 70 between the segments is filled with epoxy.

6. The epoxy handle is machined away, leaving only epoxy section 76 as shown in FIG. 3 flush with the metal portion 75 of wheel 32.

Furthermore, wheels 32 and 33 could be constructed with metal segments only in the portion of the wheel that actually contacts the track and attaches to the wires, with the segments being placed in a mold and injection-molded with plastic or some other nonconductive material comprising the remaining part of the wheel.

Figure 2:
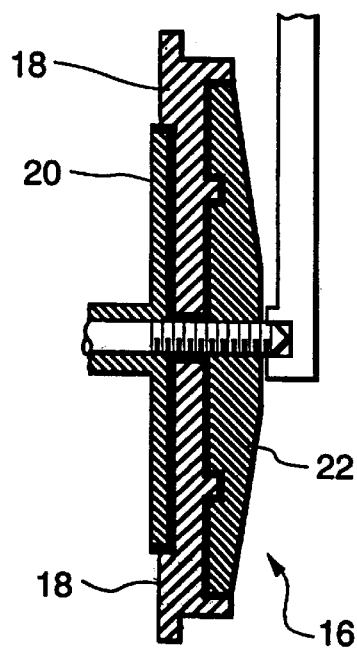
FIG. 2 is a cross-sectional illustration of a wheel of FIG. 1

As shown in FIGS. 3 and 4, a standard conductive stub-axle 54 known in the art is attached in the center of the wheel to receive axle 38. Stub-axle 54 typically has two sections—a larger diameter section 56 for receiving axle 38, and a smaller diameter section 58 adapted to be snapped into a standard model railroad wheel bearing (not shown) known in the art for attaching wheel assemblies. A standard non-conductive bushing 55 insulates wheel segments I–V from stub-axle 54. Bushing 55 may be a component of a standard metal wheel that remains in the center of the wheel during the cutting and processing steps described above to fashion the standard wheel into a commutator. During the cutting steps to segment the metal wheel, the cutting blade may penetrate the wheel until it just "nicks" bushing 55. Thus, when slots 70 are filled with epoxy, the epoxy fills into the nicks in bushing 55 also, providing additional support for the completed wheel assembly. Unlike wheel 16 shown in FIG. 2, wheels 32 and 33 do not require inner and outer non-conductive disks for mounting therein.

Thus, motor 30 may replace non-motorized wheels in standard model train engines or railcars. Because there is no external overhead horseshoe magnet 10 requiring a special bridge 24 as shown in FIG. 1 and described in the '344 patent, a motor of the present invention may be acceptable for retrofit into standard pre-existing model railcars without requiring excessive modification. Casing 40 must be fixed to the train truck in some way so that it does not rotate, otherwise motor 30 is self-contained and needs no special adaptation.

Axle 38 may typically comprise steel. Casing 40 typically has a stamped steel body 41 with oilite bronze endcaps 42 and 43 attached the body with rivets 72. Magnets 44 are typically C-shaped, having the essentially the same outer radius as the inner radius of cylindrical body 41 of casing 40, and held within the casing by abutting one end of each against tab 62 and biasing the other end with a spring clip 60 between the two magents, as shown in FIG. 5. Bearings 36 and 36' typically comprise plastic, such as Delrin®, manufactured by DuPont of Wilmington, Del. Materials of construction for the various components, however, are not limited to those detailed above.

Although described herein related to a model railroad, the present invention described herein could be extended to other uses for a motor that derives power from a track upon which an object powered by the motor moves. Similarly, although expressly described as having advantages for garden model railroads or "G"-scale, such motors may be sized appropriately for any scale model railroad known in the art. Although various embodiments of the invention have been described, it will be understood that the invention is not limited to these embodiments, but is capable of numerous modifications of parts, elements and materials without departing from the invention.

What is claimed:

1. A motor comprising:

an axle adapted to rotate about an axis;

a wound armature fixed to and concentric with said axis;

two segmented wheel commutators fixed on opposite ends of said axle concentric with said axis, each commutator comprising a plurality of segments insulated from one another, and said commutators adapted to conduct electricity across a set of tracks;

a motor casing surrounding and enclosing said armature, said casing further comprising opposite end caps and a cylindrical body concentric with said axis; and a pair of permanent magnets mounted opposite one another in said casing body.

2. The motor of claim 1 further comprising:

a bearing aperture in each casing end cap;

a first and second bearing, each fixed to adapted to rotate with said axle concentric with said axis, each bearing inserted in one of said bearing apertures and having a plurality of wire channels therethrough; and a plurality of wires, each wire electrically connected between one segment of one wheel commutator and an opposite segment of the opposite wheel commutator, each wire between said commutators disposed through one of said bearing wire channels in said first bearing, across said armature, and through one of said bearing wire channels in said second bearing.

3. The motor of claim 2 in which each wheel consists essentially of conductive segments separated by non-conductive epoxy, and a non-conductive bushing adapted to receive said axle.

4. The motor of claim 2 in which each bearing comprises plastic.

* * * * *